United States Patent
Murdica et al.

(10) Patent No.: US 10,374,790 B2
(45) Date of Patent: Aug. 6, 2019

(54) COUNTERMEASURE METHOD FOR AN ELECTRONIC COMPONENT IMPLEMENTING AN ELLIPTIC CURVE CRYPTOGRAPHY ALGORITHM

(71) Applicant: SECURE-IC SAS, Cesson-Sévigné (FR)

(72) Inventors: Cédric Murdica, Rennes (FR); Sylvain Guilley, Paris (FR)

(73) Assignee: SECURE-IC SAS, Cesson-Sévigné (FR)

( * ) Notice: Subject to any disclaimer, the term of this patent is extended or adjusted under 35 U.S.C. 154(b) by 0 days.

(21) Appl. No.: 15/118,500

(22) PCT Filed: Feb. 12, 2015

(86) PCT No.: PCT/EP2015/052908
§ 371 (c)(1),
(2) Date: Aug. 12, 2016

(87) PCT Pub. No.: WO2015/121324
PCT Pub. Date: Aug. 20, 2015

(65) Prior Publication Data
US 2017/0180114 A1    Jun. 22, 2017

(30) Foreign Application Priority Data
Feb. 12, 2014  (FR) ..................... 14 51096

(51) Int. Cl.
*H04L 29/06* (2006.01)
*G06F 21/00* (2013.01)
(Continued)

(52) U.S. Cl.
CPC ............ *H04L 9/003* (2013.01); *H04L 9/3066* (2013.01); *H04L 2209/04* (2013.01); *H04L 2209/08* (2013.01)

(58) Field of Classification Search
CPC .... H04L 9/003; H04L 9/3066; H04L 2209/08
See application file for complete search history.

(56) References Cited

U.S. PATENT DOCUMENTS

| 6,748,410 B1* | 6/2004 | Gressel | G06F 7/728 |
| | | | 708/491 |
| 2002/0062330 A1* | 5/2002 | Paar | G06F 7/724 |
| | | | 708/492 |

(Continued)

FOREIGN PATENT DOCUMENTS

CN          103441846 A      12/2013

OTHER PUBLICATIONS

Masak, Carl. "t3:Addition Chains". www.strangelyconsistent.org/blog/t3-addition-chains retrieved Jan. 1, 2018. Date Mar. 14, 2012. pp. 1-3.*

(Continued)

*Primary Examiner* — Lisa C Lewis
(74) *Attorney, Agent, or Firm* — Meagher Emanuel Laks Goldberg & Liao, LLP (57) ABSTRACT

The subject of the invention is a countermeasure method for an electronic component implementing a public-key cryptography algorithm on an elliptic curve E defined over a field 𝕂 and comprising an iterative scalar multiplication operation making it possible to obtain a point [k]P on the basis of a point P of the curve E and of an integer k that must remain secret, the electrical consumption of the electronic component being dependent on the value taken by at least one so-called critical point used during said operation to iteratively determine the point [k]P. The method comprises: a step (500) of providing at least one power of a predefined non-zero constant element c of 𝕂 different from one; a step (501) of initializing the coordinates of the at least one critical point to a predefined value; a step (502) implementing the scalar multiplication operation, the coordinates associated (Continued)

with at least one critical point being modified at each iteration by multiplying at least one of the coordinates of this point by the at least one power of the element c obtained in the providing step (500).

17 Claims, 8 Drawing Sheets

(51) Int. Cl.
*H04L 9/00* (2006.01)
*H04L 9/30* (2006.01)

(56) References Cited

U.S. PATENT DOCUMENTS

| | | |
|---|---|---|
| 2007/0177721 A1 | 8/2007 | Itoh et al. |
| 2009/0041229 A1 | 2/2009 | Douguet |
| 2010/0067690 A1* | 3/2010 | Han .................. G06F 7/725 380/44 |
| 2010/0172490 A1* | 7/2010 | Braun ................. G06F 7/725 380/28 |
| 2012/0008780 A1 | 1/2012 | Al-Somani et al. |

OTHER PUBLICATIONS

International Search Report for PCT/EP2015/052908, dated Apr. 24, 2015.

Karakoyunlu et al., "Efficient and side-channel-aware implementations of elliptic curve cryptosystems over prime fields", IET Information Security, vol. 4, No. 1, pp. 30-43, Mar. 18, 2010.

Magenheimer D J., et al., "Integer Multiplication and Division on the HP Precision Architecture", IEEE Transactions on Computers, vol. 37, No. 8, pp. 980-990, Aug. 1, 1988, Los Alamitos, CA, US.

Smart N P, et al., "Randomised representations", IET Information Security, vol. 2, No. 2, pp. 19-27, Jun. 9, 2008.

Mustapha Hedabou et al., "Some Ways to Secure Elliptic Curve Cryptosystems", Advances in Applied Clifford Algebras, vol. 18, No. 3-4, pp. 677-688, Sep. 1, 2008.

Written Opinion for PCT/EP2015/052908, dated Apr. 24, 2015.

C. Murdica, S. Guilley, J.-L. Danger, P. Hoogvorst and D. Naccache: "Same Values Power Analysis Using Special Points on Elliptic Curves", Workshop on Constructive Side-Channel Analysis and Secure Design, 2012.

C. D. Walter: "Sliding Windows Succumbs to Big MacAttack", Workshop on Cryptographic Hardware and Embedded Systems, 2001.

Chevallier-Mames, B., Ciet, M., and Joye, M.: "Low-Cost Solutions for Preventing Simple Side-Channel Analysis: Side-Channel Atomicity", IEEE Transactions on Computers, pp. 760-768, 2004.

T. Markettos and S. W. Moore: "The Frequency Injection Attack on Ring-Oscillator-Based True Random Number Generators", pp. 317-331, CHES 2009.

English translation of Chinese Office Action issued in corresponding CN 201580008628.9, dated Feb. 3, 2019.

Li Chao et al.: "Mathematical Theory of Computer Algebra System", Tsinghua University Press, ISBN: 9787302230106 (Oct. 1, 2010).

* cited by examiner

COUNTERMEASURE METHOD FOR AN ELECTRONIC COMPONENT IMPLEMENTING AN ELLIPTIC CURVE CRYPTOGRAPHY ALGORITHM

The invention relates to a countermeasure method for an electronic component implementing an elliptic curve public-key cryptography algorithm, to an electronic component and to a system implementing the method. It applies to the domain of elliptic curve cryptography. Elliptic curve cryptography makes it possible in particular to generate signatures, to encrypt digital messages or to set up encryption keys.

The activity of electronic circuits can be observed while they are operating, via physical magnitudes such as power consumption, computation time or electromagnetic radiation.

These physical quantities depend both on the computation architectures and on the data manipulated inside the circuit. Information about the processed data is therefore indirectly available outside the circuit by observing said quantities, which are known as hidden channels or side channels.

The dissipation of these physical quantities can jeopardize the security of systems that process secret data protected in particular by cryptography schemes. Thus, if secret data are protected using a cryptography algorithm with secret encryption key, the robustness of the protection lies in the ability to keep said key actually secret. Dissipation of the physical quantities may allow a third party to obtain said key by launching suitable attacks and, consequently, to access the secret data.

An attack based on observing physical quantities dissipated by said circuit is usually referred to as a hidden-channel attack. Throughout this description, a third party using observation-based attack schemes to access data not intended for them is called an attacker, and the dissipated physical quantities, for their part, are called leaks or hidden channels.

Powerful observation-based attacks now exist that make it possible to access data processed by protected circuits. Using these schemes, it is possible to circumvent the security conferred at the mathematical level by cryptography.

Cryptographic applications based on elliptic curves usually use Elliptic Curve Scalar Multiplication ECSM as the main operation. This operation determines a scalar $[k]P=P+P+\ldots+P$ on the basis of a point P and of an integer k. The point P is ordinarily a public item of data, while the integer k is a secret.

Figure 2:
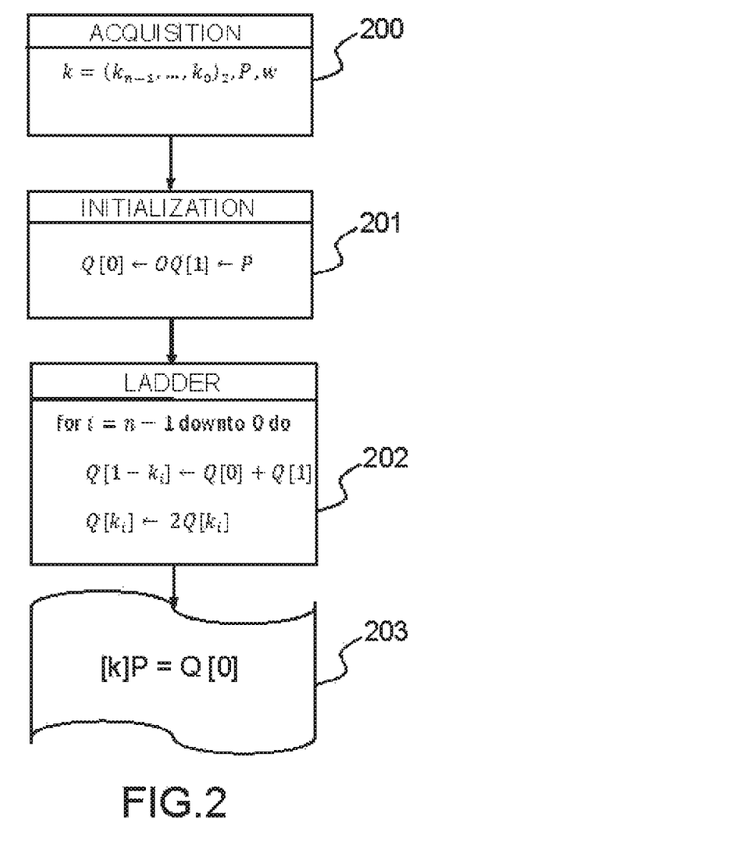
FIG. 2 gives an exemplary implementation of elliptic curve scalar multiplication ECSM with the aid of a Montgomery ladder.
Figure 3:
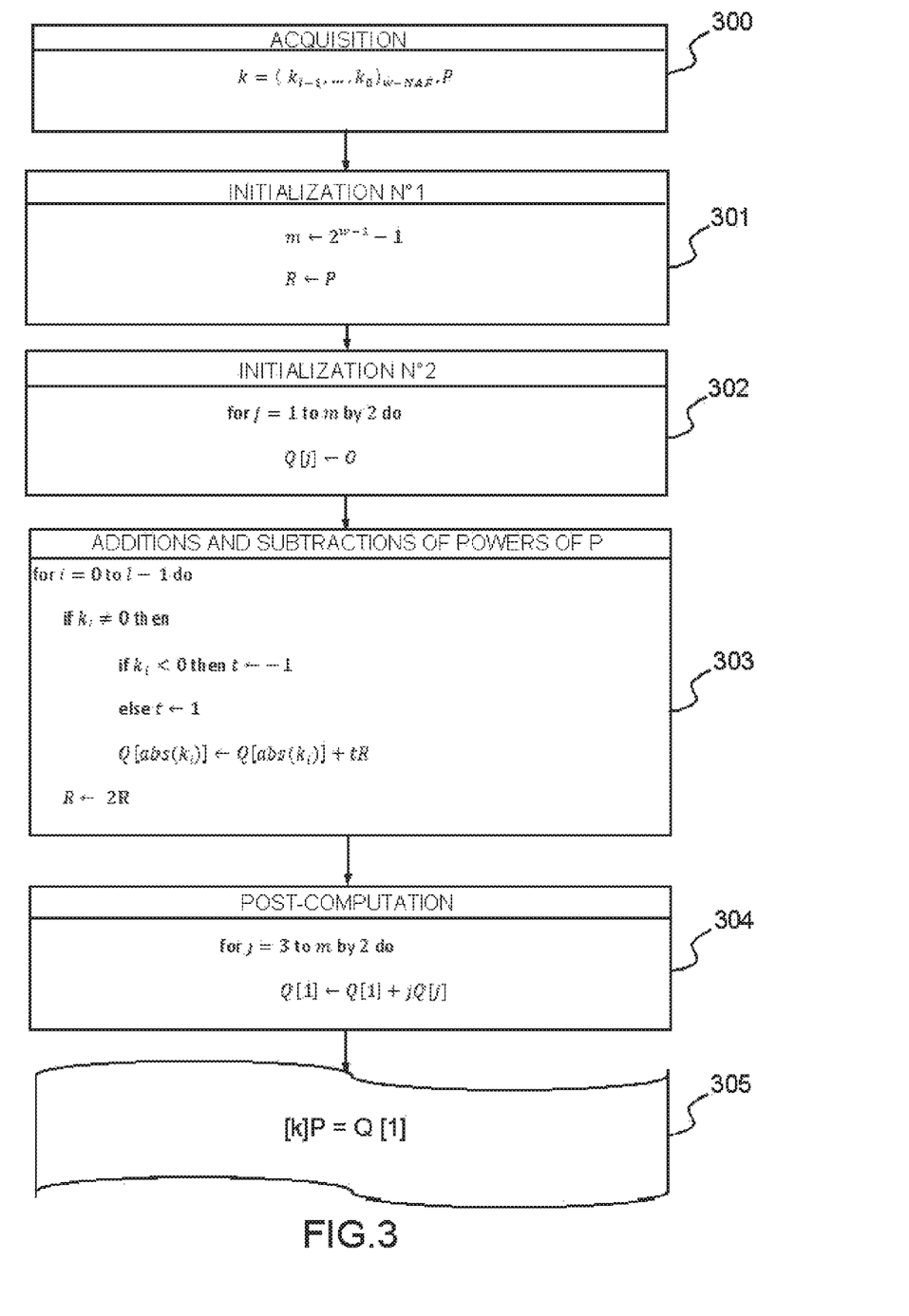
FIG. 3 gives an exemplary implementation of elliptic curve scalar multiplication ECSM with the aid of a right-to-left sliding window over wNAF.

The operation of elliptic curve scalar multiplication ECSM can be implemented with the aid of several prior art schemes, including the technique termed left-to-right window scalar multiplication (see FIG. 1), the Montgomery ladder (see FIG. 2) and the technique termed Scalar Multiplication with right-to-left sliding window over wNAF (see FIG. 3). These schemes usually operate bitwise. The basic elliptic curve operations such as addition or doubling, as well as the points used (pre-computed or dynamic), depend on the current bits.

Certain hidden-channel attacks are very powerful since a single observation of an ECSM multiplication is sufficient to determine all the bits of the scalar.

There is an attack that can be used against cryptography schemes based on elliptic curves which consists in determining which values are manipulated during a specific operation by comparing sub-traces of the consumption of current. Such an attack is referred to as horizontal. An example is the Big Mac attack, but there are others, such as the SVA (Same-Values Analysis) attack described in the article by C. Murdica, S. Guilley, J. L. Danger, P. Hoogvorst and D. Naccache entitled *Same Values Power Analysis Using Special Points on Elliptic Curves, Workshop on Cryptographic Hardware and Embedded Systems,* 2001. The act of ascertaining which values aremanipulated reveals information about the scalar. This attack is launched by comparing the consumption of current at various iterations of the ECSM. Given that the consumption of current is correlated with the manipulated values, the attack consists in detecting whether the same values are manipulated at different times in the ECSM scalar multiplication computation.

In the case of the Montgomery ladder (see FIG. 2), Q[0] is the operand 1 during addition (the operands 1 and 2 of an addition are not used in the same way). Q[0] will be the input of the doubling only if $k_i=0$.

In the case of scalar multiplication with right-to-left sliding window over wNAF (see FIG. 3), one has to detect whether the point R is used twice during one and the same iteration.

Analysis of the result of the addition of an iteration and of the input of the addition of the succeeding iterations can also disclose information.

This type of attack is very powerful since it is not necessary to know the base point and the scalar can be recovered in full through a single trace. Thus, countermeasures by randomization of the starting point or by randomization of the scalar are ineffective. Furthermore, this type of attack may be adapted to suit other ECSM operations. This type of attack is called "Big Mac" and is presented in the article by C. D. Walter entitled *Sliding Windows Succumbs to Big MacAttack, Workshop on Constructive Side-Channel Analysis and Secure Design,* 2012.

One of the aims of the invention is to remedy inadequacies/drawbacks of the prior art and/or to make improvements thereto.

For this purpose, the subject of the invention is a countermeasure method for an electronic component implementing a public-key cryptography algorithm on an elliptic curve E defined over a field $\mathbb{K}$ and comprising an iterative scalar multiplication operation making it possible to obtain a point [k]P on the basis of a point P of the curve E and of an integer k that must remain secret, the electrical consumption of the electronic component being dependent on the value taken by at least one so-called critical point used during said operation to iteratively determine the point [k]P, the method comprising:
- a step of providing at least one power of a predefined non-zero constant element c of $\mathbb{K}$ different from one;
- a step of initializing the coordinates of the at least one critical point to a predefined value;
- a step implementing the scalar multiplication operation, the coordinates associated with at least one critical point being modified at each iteration by multiplying at least one of the coordinates of this point by the at least one power of the element c obtained in the providing step (500).

According to one embodiment, the element c is chosen to be less than or equal to half the cardinality of the base group of the curve.

According to one embodiment, the element c is chosen to be of order δ strictly greater than three times the number of iterations of the scalar multiplication so as to prevent the element one from occurring during the successive multiplications of powers of c.

According to one embodiment, the following multiplications c, $c^2$, $c^3$, $c^4$ and $c^6$ by the powers of c are determined by using addition chains, c being chosen so as to minimize the length of said addition chains.

According to one embodiment, the coordinates associated with at least one critical point are modified by projection equivalence.

According to one embodiment, the coordinates associated with at least one critical point are modified by the implementation of an isomorphism φ between the curve E and a second elliptic curve E'.

According to one embodiment, the scalar multiplication operation is implemented by a left-to-right window scalar multiplication, the window being of size w.

According to one embodiment, the scalar multiplication operation is implemented by a Montgomery ladder.

According to one embodiment, the scalar multiplication operation is implemented by a scalar multiplication with right-to-left sliding window over wNAF.

According to one embodiment, the scalar multiplication operation is implemented with the following steps:
  initialization to zero of the coordinates of a point Q used as working variable and corresponding to a partial scalar multiplication;
  pre-computation of $2^w$ multiples R[j] of P with j=1 ... $2^w$;
  doubling of Q and addition of R[v] to Q with sliding window, the countermeasure being implemented by modifying at each iteration i the coordinates $(X_{R[v]}, Y_{R[v]}, Z_{R[v]})$ of the point R[v] with V=$(k_i, \ldots, k_{i-w+1})_2$ using the following expression:

$$(X_{R[v]}, Y_{R[v]}, Z_{R[v]}) = (c^2 X_{R[v]}, c^3 Y_{R[v]}, c Z_{R[v]})$$

According to one embodiment, the scalar multiplication operation is implemented with the following steps:
  initialization to zero of the coordinates of a point Q used as working variable and corresponding to a partial scalar multiplication;
  pre-computation of $2^w$ multiples R[j] of P with j=1 ... $2^w$;
  doubling of Q and addition of R[v] to Q with sliding window (603), the countermeasure being implemented by modifying the coordinates $(X_Q, Y_Q)$ and $(X_{R[j]}, Y_{R[j]})$ of the points R[j] and Q at each iteration in the following manner:
  i. $(X_Q, Y_Q) = (c^2 X_Q, c^3 Y_Q)$
  ii. for j ranging from 1 to $2^w$, $(X_{R[j]}, Y_{R[j]}) = (u^2 X_{R[j]}, u^3 Y_{R[j]})$.

The subject of the invention is also an electronic circuit for public-key cryptography on an elliptic curve E defined over a field $\mathbb{K}$, implementing a scalar multiplication operation making it possible to obtain a point [k]P on the basis of a point P of the curve E and of an integer k that must remain secret, the electrical consumption of said component being dependent on the value taken by at least one so-called critical point used during said operation to iteratively determine the point [k]P, the circuit comprising at least one module adapted so as to:
  provide a predefined non-zero constant element c of $\mathbb{K}$ different from one;
  initialize coordinates of the at least one critical point to a predefined value;
  implement the scalar multiplication operation, the coordinates associated with at least one critical point being modified at each iteration by multiplying at least one of the coordinates of this point by a power of the element c.

According to one embodiment, the electronic circuit comprises an internal memory in which the element c is stored.

According to one embodiment, computation procedures corresponding to the addition chains required for updating the coordinates of the at least one critical point are pre-computed and stored in the memory internal to the component.

The subject of the invention is also a system for public-key cryptography on an elliptic curve E defined over a field $\mathbb{K}$ comprising an electronic circuit such as described above and a memory external to said circuit and in which the element c is stored.

According to one embodiment, computation procedures corresponding to the addition chains required for updating the coordinates of the at least one critical point are pre-computed and stored in the external memory.

The subject of the invention is also a computer program comprising instructions for the execution of the method described above, when the program is executed by a data processing module.

Other characteristics and advantages of the invention will become apparent with the aid of the following description given by way of nonlimiting illustration and with regard to the appended drawings among which.

Figure 1:
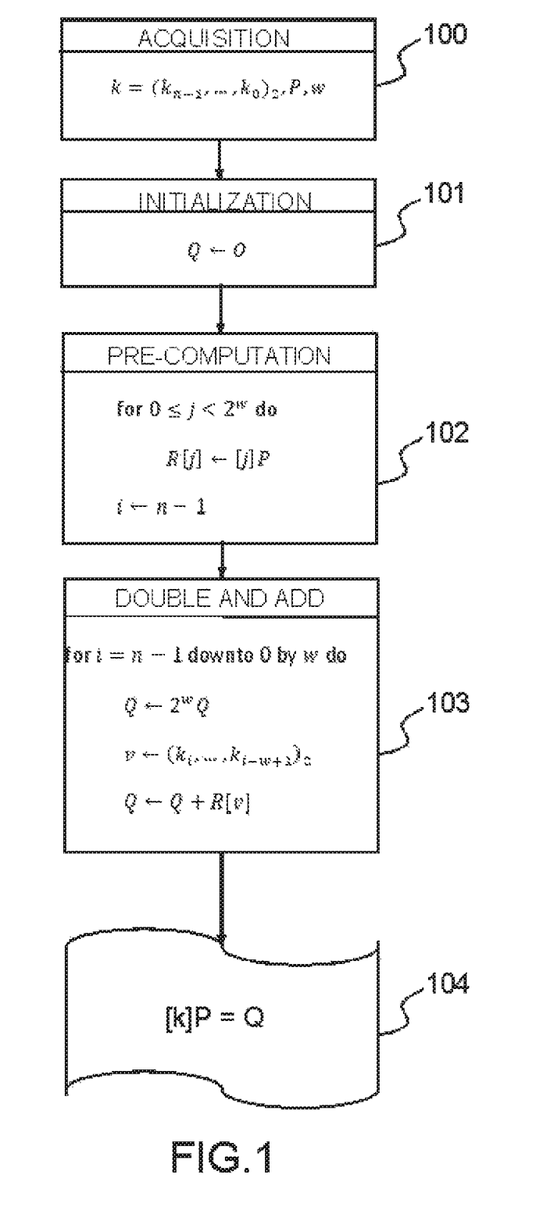
FIG. 1 gives an exemplary implementation of elliptic curve scalar multiplication ECSM with the aid of the windowed scalar multiplication technique.

FIG. 1 gives an exemplary implementation of elliptic curve scalar multiplication ECSM with the aid of the windowed scalar multiplication technique.

The data used as input 100 are:
  an integer k corresponding to the private key $(k_{n-1}, \ldots, k_0)_2$ expressed in base two;
  a point P of the curve which usually corresponds to a public item of data;
  an integer w corresponding to the size of the window.

It should be noted that w is chosen with w|n. If this is not the case, the scalar is left-padded with zeros.

In a first step 101, a point Q used as working variable and corresponding to a partial scalar multiplication is initialized to zero.

In a second step 102, $2^w$ multiples R[j] of P are pre-computed.

A third step 103 is then applied so as to carry out a double-and-add processing with sliding window of length w.

The value taken at the end of step 103 by the variable Q is then returned as result and corresponds to the scalar [k]P.

FIG. 2 gives an exemplary implementation of elliptic curve scalar multiplication ECSM with the aid of a Montgomery ladder.

The data used as input 200 are:
an integer k corresponding to the private key $(k_{n-1}, \ldots, k_0)_2$ expressed in base two;
a point P of the curve which usually corresponds to a public item of data.

In a first step 201, two working variables Q[0] and Q[1] corresponding to two partial scalar multiplications are respectively initialized to zero and P.

A second step 202 carries out the ladder-based computation, and the value taken by the variable Q[0] at the end of the step is then proposed 203 as result and corresponds to the quantity [k]P.

FIG. 3 gives an exemplary implementation of elliptic curve scalar multiplication ECSM with the aid of a right-to-left sliding window over wNAF.

The NAF (Non-Adjacent Form) representation of size w of a positive integer k corresponds to the following expression:

$$k = \Sigma_{i=0}^{l-1} k_i 2^i$$

in which:
each coefficient $k_i$ different from 0 is odd;
$-2^{w-1} < k_i < 2^{w-1}$,
$k_{l-1} \neq 0$;
at most one among w consecutive coefficients is different from zero.

This representation is useful in certain cases of exponentiation since it has the particular feature of containing few elements that differ from zero.

The data used as input 300 of this scheme are:
the NAF representation of the size of the window $k = (k_{l-1}, \ldots, k_0)_{w-NAF}$;
a point P of the curve which usually corresponds to a public item of data.

A first step 301 initializes a variable m and a variable R serving as register for accumulating the powers of P.

A second step 302 initializes m variables Q[ ] of partial scalar multiplication to zero.

A step 303 carries out an updating of the variables Q[ ] by additions and subtractions of powers of P. The function abs( ) is a function which returns the absolute value of its input parameter. In this step, the doubling of the accumulation register R is executed at each iteration of the incrementation loop over the variable i.

A step 304 implements a post-computation phase which iteratively determines Q[1] by addition of a partial multiplication j. Q[j].

The value taken at the end of step 303 by the variable Q[1] is then returned 304 as result and corresponds to the point [k]P.

Figure 4:
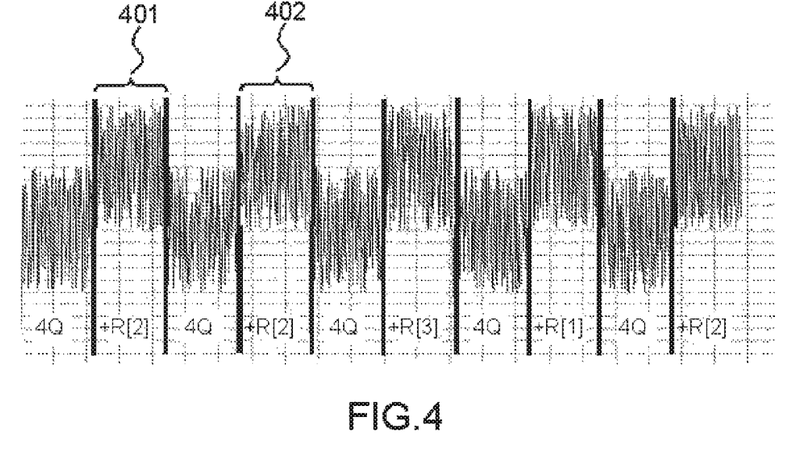
FIG. 4 gives an exemplary trace generated by the technique of scalar multiplication with window of length two.

FIG. 4 gives an exemplary trace generated by the technique of scalar multiplication with window of length two.

For w=2, R[1], R[2] and R[3] are equal to:
R[1]=[(0 1)]$_2$P
R[2]=[(1 0)]$_2$P
R[3]=[(1 1)]$_2$$^{13}$ In this simple example given by way of illustration, the scalar k is as follows:
k=(10 10 11 01 10)$_2$
[k]P will be computed in the following manner:

$$[k]P = 4(4(4(4R[2]+R[2])+R[3])+R[1])+R[2]$$

The scalar k can easily be deduced if an attacker is capable of determining which point out of R[1], R[2] or R[3] is added to Q at each iteration. Accordingly, the consumption of current at the various iterations of the ECSM multiplication is estimated. The Big-Mac attack exploits the fact that the consumption of current is correlated with the values of the added point.

In the example of FIG. 4, if the records of electrical consumptions 401, 402 corresponding to two successive iterations of step 103 are correlated, this means that:
$(k_{n-1}, k_{n-2}) = (k_{n-3}, k_{n-4})$
If the records of electrical consumption 401, 402 are not correlated, this means on the contrary that:
$(k_{n-1}, k_{n-2}) \neq (k_{n-3}, k_{n-4})$ The objective of the Big-Mac attack is to detect whether same values are manipulated at different times during the scalar multiplication computation so as to get back to the secret k.

To counteract this type of attack, the cryptography method according to the invention comprises a countermeasure mechanism based on a modification of the coordinates of at least one critical point after its use during the elliptic curve scalar multiplication. Accordingly, properties of the elliptic curves are exploited. In this description, a point is termed critical when observation of the variations in the electrical consumption of the electronic component resulting from the use of this point during the implementation of the scalar multiplication can reveal all or part of the scalar k.

Figure 5:
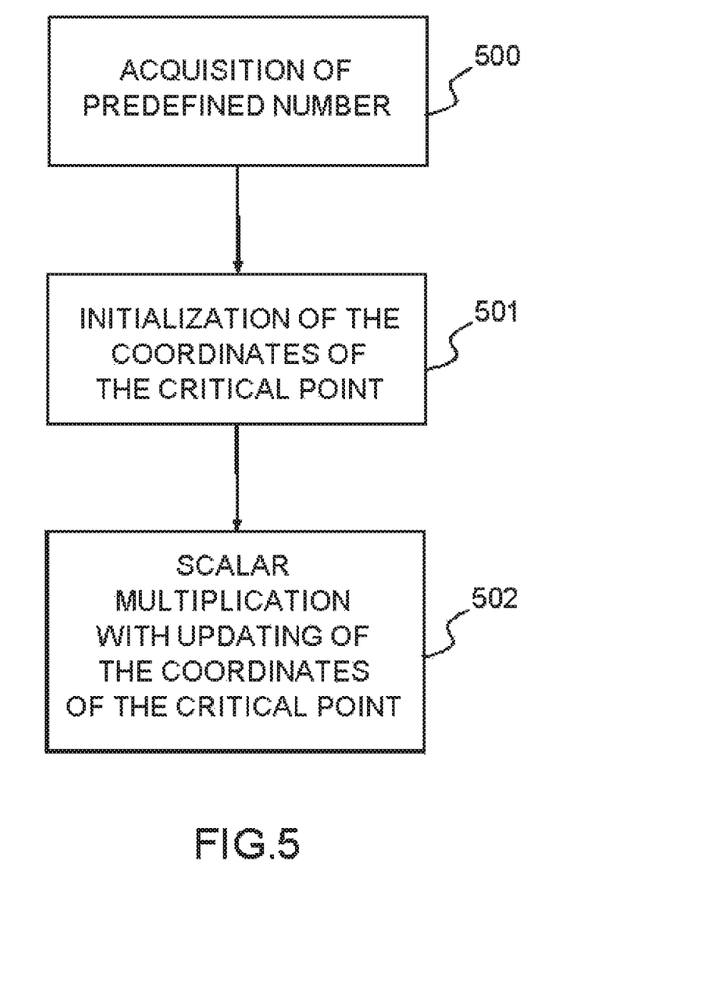
FIG. 5 is a chart illustrating in a simplified manner the method according to the invention.

FIG. 5 is a chart illustrating in a simplified manner the method according to the invention.

The invention relates to a countermeasure method in an electronic circuit implementing an elliptic curve public-key cryptography algorithm. Accordingly, it applies a scalar multiplication operation on the elliptic curve E so as to obtain a point [k]P on the basis of a point P of E and of an integer k while applying a countermeasure mechanism. This operation is based on the use of at least one critical point.

The method according to the invention comprises a step 500 of providing at least one power of a predefined non-zero constant element c. This element c belongs to the field $\mathbb{K}$ and is different from one. By way of example, this step can make it possible to obtain the element c itself (which is in fact equivalent to the power of one of this element, i.e. c^1). In an alternative embodiment, this step can make it possible to obtain a set of powers of c made up for example of c^1, c^2 and c^3.

Thus, several powers of c can be stored in a cryptography circuit implementing the invention, this having the decisive advantage of making it difficult for a third party to detect the value of c used.

In one embodiment, the element c is chosen to be of order δ strictly greater than three times the number of iterations of the scalar multiplication so as to prevent the element one from occurring during the successive multiplications of powers of c. It is recalled that the order of an element e of $\mathbb{K}$ is the smallest non-zero integer δ such that $e^\delta = 1$.

The person skilled in the art will readily understand that other data may also be acquired during this step, including among others the coordinates of the point P, the scalar k or the width w of the working window if appropriate.

A step 501 of the method then initializes the critical point or points used for the implementation of the scalar multiplication. Accordingly, and depending on the technique used for the implementation of the scalar multiplication, the coordinates of the critical point or points can be initialized to zero, with the coordinates of the point P or to any other suitable value.

A step 502 implements the scalar multiplication operation on the elliptic curve E in an iterative manner as well as the countermeasure associated therewith. The countermeasure consists in modifying the coordinates of at least one critical point at each iteration. The coordinates are modified by multiplying at least one of them by a power of the element c acquired in step 500. The value of said element is for example stored in the electronic circuit or in a memory accessible from said circuit.

The element c is predefined in the sense that it is chosen and stored before the method is applied.

The technique used for the implementation of the scalar multiplication can be chosen from among the following algorithms: left-to-right window scalar multiplication, Montgomery ladder, scalar multiplication with right-to-left sliding window over wNAF.

The method according to the invention comprises two preferred embodiments.

A first preferred embodiment is based on the updating of the representative of at least one critical point so as to maintain an equivalence in terms of projective property of the point before and after updating its coordinates.

A second preferred embodiment is based on the updating by isomorphism of the representatives of the points used, that is to say of their coordinates.

The element c is predefined in the sense that it is chosen and stored before the method is applied. By way of example, an electronic circuit implementing the method according to the invention will be allocated a value of c chosen at the time it is produced and this value will be stored in the circuit. The designer of such a circuit may however allocate different values of c for the various circuits that he produces. Advantageously, allocating a plurality of values c makes it possible to adjust the compromise between security and complexity of implementation. It should be noted that c must be different from one in order for the coordinates to actually be modified.

The coordinates of the critical point or points can be updated at various times:
  at the start of an iteration;
  at the end of an iteration;
  after an elliptic curve operation such as doubling or addition;
  or during an elliptic curve operation.

Since the representative or representatives of the critical points are updated after each use of said point, the circuit can be protected against horizontal attacks.

The effectiveness of the ECSM multiplication which includes this countermeasure mechanism depends in particular on the time chosen at which to update the coordinate or coordinates of the points. This time can be chosen so as to avoid compromising security. By way of example, if the atomicity countermeasure as presented in the article by Chevallier-Mames, B., Ciet, M., and Joye, M. entitled *Low-Cost Solutions for Preventing Simple Side-Channel Analysis: Side-Channel Atomicity*, IEEE Transactions on Computers, pages 760-768, 2004, is applied with the scalar multiplication with right-to-left sliding window over wNAF, the update can advantageously be applied after each atomic block.

It should be noted that a method for randomizing the coordinates of the starting point based on equivalence of the coordinates is described in European patent publication EP1166494 B1. The term randomization usually refers to a technique which makes it possible to introduce a random element into a data processing scheme. In this publication, an element of the field is drawn at random, thereby making it possible to randomize the starting point at the beginning of the ECSM scalar multiplication.

Another randomization method is disclosed in European patent publication EP1381936 B1 and is based in particular on randomly drawing the starting curve by isomorphism. In this case, an element of the field is drawn at random so as to randomize the curve and the points at the beginning of the ECSM scalar multiplication.

These two schemes make it possible to counteract attacks of DPA (Differential Power Analysis) and CPA (Chosen-Plaintext Attack) type. However, the Big-Mac attack and other so-called horizontal attacks can be envisaged even if these schemes are implemented. It is recalled that an attack is termed horizontal when it is carried out on a single trace of a signal representative of the electrical consumption of the cryptography circuit. An attack is termed vertical when it is carried out on a plurality of traces of signals representative of the electrical consumption of the cryptography circuit. Within the framework of the invention, the coordinates of at least one critical point are modified at each iteration of the scalar multiplication, thereby rendering most horizontal attacks inoperative.

In contrast to these techniques, the method according to the invention uses a predefined constant for updating the coordinates, thus affording several decisive advantages.

Thus, the method according to the invention advantageously allows an implementation of reduced complexity compared with the prior art cited above. Indeed, the generation of random numbers as such is complex. This usually requires the use of a TRNG (True Random Number Generator) or PRNG (PseudoRandom Number Generator) outside the electronic circuit implementing the elliptic-curve-based cryptography method. Furthermore, these generators are vulnerable to attacks of generator-blocking type as described in the article by T. Markettos and S. W. Moore entitled *The Frequency Injection Attack on Ring-Oscillator-Based True Random Number Generators*, CHES 2009, pages 317-331.

Another advantage is that the way in which the multiplication of the coordinates of the critical point or points by the predefined constant element c is implemented can be optimized by using for example addition chains, this not being possible in the case of random drawing.

Furthermore, when the element used for modifying the coordinates is drawn at random, it may potentially be large. By way of illustration, there is one chance in two that its high-order bit is equal to one. The effect of this will then be to require a long multiplication which is expensive in terms of computational resources.

Figure 6:
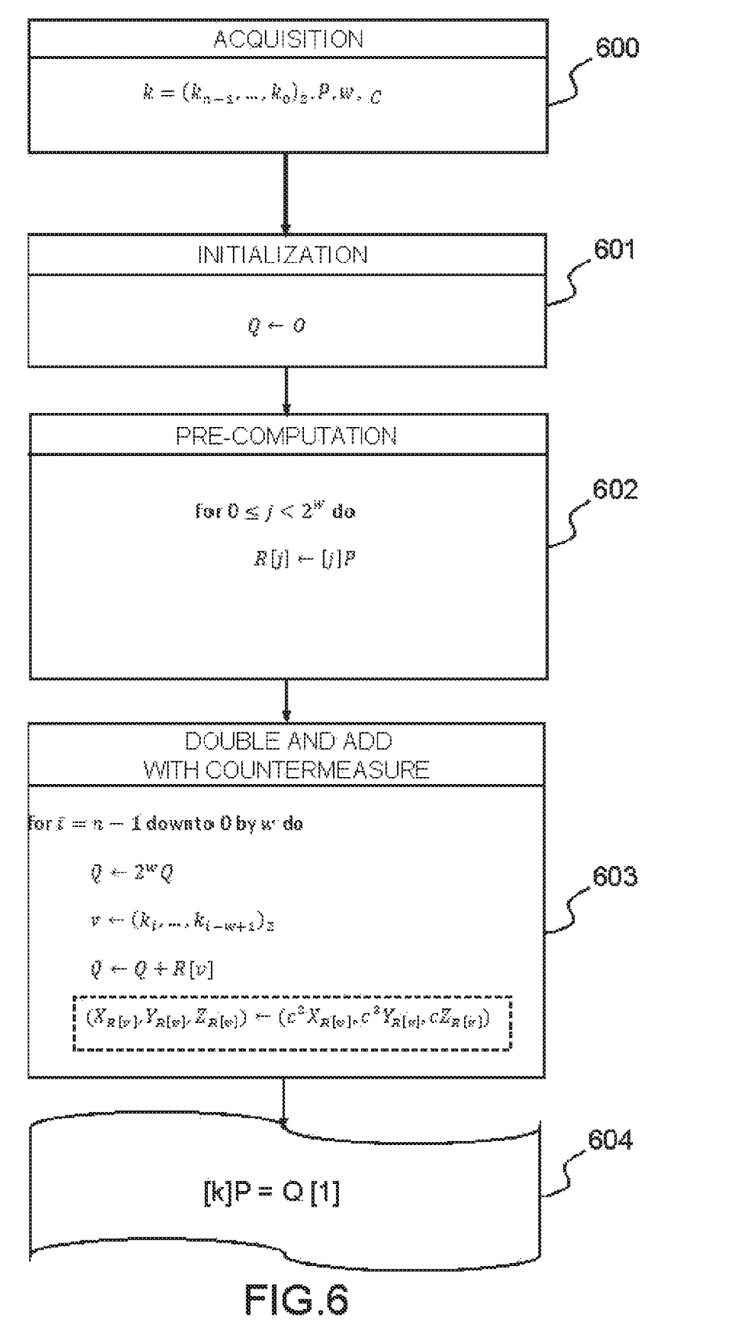
FIG. 6 gives an exemplary implementation of a countermeasure method for an electronic component implementing a public-key cryptography algorithm on an elliptic curve E with updating of the coordinates of the points based on equivalence in terms of projective properties.

FIG. 6 gives an exemplary implementation of a countermeasure method for an electronic component implementing a public-key cryptography algorithm on an elliptic curve E with updating of the coordinates of the points based on equivalence in terms of projective properties.

The points on elliptic curves are usually represented as Jacobian coordinates, called projective coordinates in this description. For a point P, the following notation is used:
  P=(X,Y,Z)

In this embodiment, equivalence in terms of projective properties for an elliptic curve is used. Equivalence in terms of projective properties means that if $\mathbb{K}$ is the base field, the representation in terms of projective coordinates (X, Y, Z) of a point P is equivalent to the representations defined by ($c^2$X, $c^3$Y, cZ) with c∈$\mathbb{K}$ * ($\mathbb{K}$ * being equal to the set $\mathbb{K}$ from which the value zero is removed). Stated otherwise, one and the same point P can be represented with the aid of several coordinate sets, a coordinate set also being called a point representative.

Equivalence in terms of projective properties means that any operation carried out in the field $\mathbb{K}$ with a first representative gives the same result as if it had been applied with a second representative, equivalent in terms of projective properties.

In this embodiment of the invention, a predefined element c of the field $\mathbb{K}$ is used to update the representative of at least one point used for the implementation of the ECSM multiplication. This update is carried out by modifying the coordinate set associated with this point in such a way as to comply with the equivalence in terms of projective properties.

In one embodiment, c is chosen to be small with respect to the cardinality of the base group over which the curve is constructed. More precisely, the number of bits coding c is chosen to be less than or equal to half the cardinality of the base group of the curve. By way of example, if the elements of the group are coded on 256 bits, the cardinality is $2^{256}$ and c can be chosen to be between 2 and $2^{128}$. This makes it possible to avoid the use of overly large values and thus to reduce the computational complexity introduced by the change of coordinates. The value of c can advantageously be chosen to be equal to three.

Figure 7:
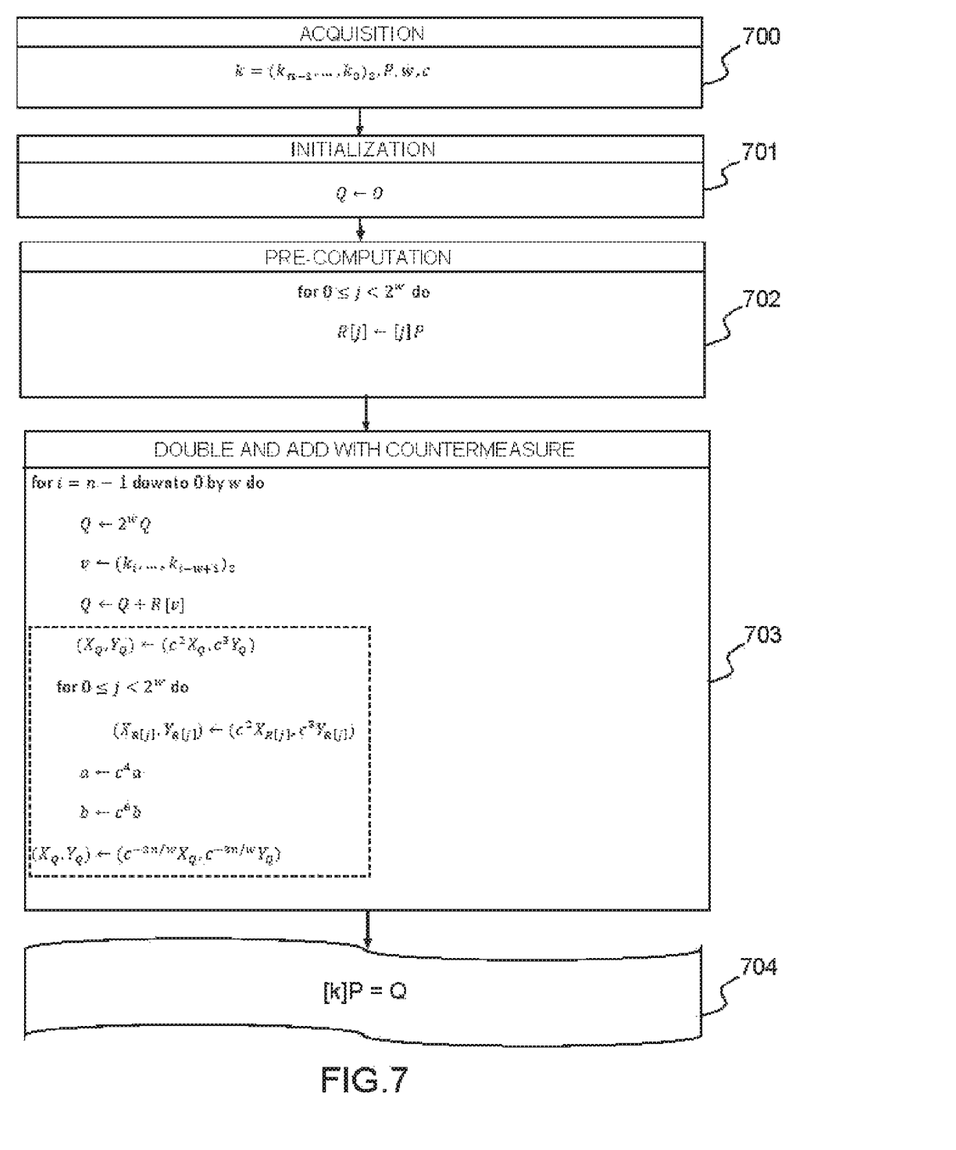
FIG. 7 gives an exemplary implementation of a countermeasure method for an electronic component implementing a public-key cryptography algorithm on an elliptic curve E with updating of the coordinates of the points by isomorphism.

FIGS. 6 and 7 are charts giving two examples of implementation of the invention with an ECSM computation by left-to-right window scalar multiplication. The person skilled in the art can readily envisage the implementation of the invention for other ECSM computations, such as for example the Montgomery ladder or the technique of scalar multiplication with right-to-left sliding window over wNAF.

The example of FIG. 6 is based on an ECSM computation by windowed scalar multiplication. Thus, as has already been set forth with the aid of FIG. 1, in this embodiment the method comprises input data 600 and implements steps 601 and 602, which correspond respectively to the input data 100 and to steps 101 and 102.

A third step 603 is then applied so as to carry out a double-and-add processing with sliding window of length w in the same manner as for step 103 but with furthermore an update at the end of each iteration of the representative ($X_{R[v]}$, $Y_{R[v]}$, $Z_{R[v]}$) of the point R[v] that was used in this iteration while complying with the equivalence in terms of projective properties. It should be noted that an iteration corresponds to the processing performed in a processing window.

This update is performed in the following manner:
($X_{R[v]}$, $Y_{R[v]}$, $Z_{R[v]}$)←($c^2 X_{R[v]}$, $c^3 Y_{R[v]}$, $cZ_{R[v]}$)

The value taken at the end of step 603 by the variable Q[1] is then provided 604 as result and corresponds to the point [k]P.

FIG. 7 gives an exemplary implementation of a countermeasure method for an electronic component implementing a public-key cryptography algorithm on an elliptic curve E with updating of the coordinates of the points by isomorphism.

An elliptic curve is defined by its reduced Weierstrass equation E given by the following expression:

$$E: y^2 = x^3 + ax + b$$

Consider a second elliptic curve defined by its reduced Weierstrass equation E' given by the following expression:

$$E': y^2 = x^3 + a'x + b'$$

It can be proven that E is isomorphic to E' if there exists $c \in \mathbb{K}$ such that:
$a' = ac^4$
$b' = bc^6$ In this case, the isomorphism $\varphi$ between E and E' is defined by the following expression:

$$\varphi((X,Y,Z)) = (c^2 X, c^3 Y, Z)$$

Just as for the previous embodiment based on the modification of coordinates by equivalence in terms of projective properties, an element c belonging to the field $\mathbb{K}$ is chosen beforehand and stored in the electronic circuit implementing the method.

After using the representative of a critical point (X,Y,Z) for an operation required for the implementation of the ECSM, $\varphi$ is applied and all the point representatives are updated.

The parameters a, b are also updated if they are used for the elliptic curve operations such as doubling or addition of points.

The example of FIG. 7 is based on an ECSM computation by windowed scalar multiplication. Thus, as has already been set forth with the aid of FIG. 1, in this embodiment the method comprises input data 700 and implements steps 701 and 702, which correspond respectively to the input data 100 and to steps 101 and 102.

A third step 703 is then applied so as to carry out a double-and-add processing with sliding window of length w in the same manner as for step 103 but with furthermore an update at the end of each iteration of the representative of the critical point Q, doing so using the following expression:

$$(X_Q, Y_Q) \leftarrow (c^2 X_Q, c^3 Y_Q)$$

Moreover, the set of $2^w$ representatives of the critical points R[j] are updated using the following expression:

$$(X_{R[j]}, Y_{R[j]}) \leftarrow (c^2 X_{R[j]}, c^3 Y_{R[j]})$$

Finally, after they have been used, the parameters are updated using the following expressions:

$$a \leftarrow c^4 a$$

$$b \leftarrow c^6 b$$

An inverse isomorphism is applied 704 so as to retranscribe the coordinates of the point Q onto the starting elliptic curve.

The value taken at the end of step 704 by the variable Q is then provided 705 as result and corresponds to the scalar [k]P.

For each of the two alternatives described enabling a change of coordinates, the use of an element c of $\mathbb{K}$ is necessary. The coordinates of at least one critical point can be updated by computing $c^2 X$, $c^3 Y$, $cZ$ or $c^2 X$, $c^3 Y$ using optimal addition chains to avoid having to compute multiplications in the field.

In both cases, the choice of a small value of c is particularly appropriate. Furthermore, it is preferable to choose an element such that the multiplications by c, $c^2$, $c^3$, $c^4$, $c^6$ or $c^2$, $c^3$, $c^4$, $c^6$ can be performed by very short addition chains. More precisely, c is chosen to be less than or equal to half the cardinality of the base group of the curve. In this way, the updating of the coordinates requires only a few additions in the field, this being much less expensive than implementing multiplications. For example, by choosing c=3, a multiplication by c can be performed as two additions in the base field, a multiplication by $c^2=9$ can be performed as four additions, and a multiplication by $c^3=27$ can be performed as six additions. The size of the addition chain for small numbers may be found at: http://oeis.org/A003313. The choice of c allows a large number of possible optimizations, the addition chains included. Because the value of c is predefined and fixed, it is for example possible to determine in advance the computation procedures corresponding to the addition chains required for updating the coordinates of the critical points can be prepared in advance. Thus, these chains of computations can advantageously be integrated into the electronic component implementing the elliptic-curve-based cryptography operations.

According to one aspect of the invention, the following multiplications c, c^2 and c^3 by the powers of c are determined using addition chains, c being chosen in this case so as to minimize the length of said chains. c^2 and c^3 represent respectively the powers of two and of three of c.

Figure 8:
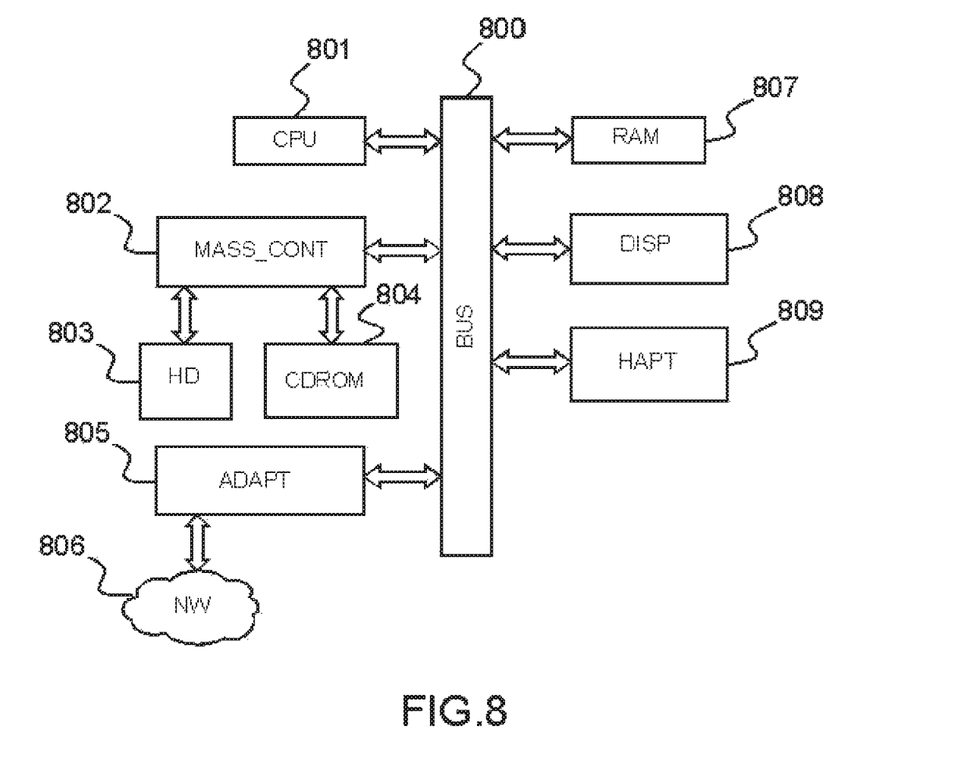
FIG. 8 presents an electronic system able to implement the countermeasure method according to the invention.

FIG. 8 presents an electronic system able to implement the countermeasure method according to the invention. This system comprises a central processing unit (CPU) 801 linked to an internal communication bus 800. A random access memory (RAM) 807 is also connected to the BUS.

The system furthermore comprises a mass storage peripheral controller 802 whose function is to manage accesses to a mass memory, such as a hard disk 803.

The mass memory stores computer program instructions and data allowing the implementation of the method for allocating temporary authentication data.

The mass memory can be composed of any form of non-volatile memory, such as for example EPROMs, EEPROMs, flash memories, magnetic disks such as internal hard disks and removable disks, magneto-optical disks, and CD-ROM disks 804.

The system also comprises a network adaptor 805 managing access to a telecommunication network 806.

Optionally, the device can also comprise a haptic facility 809 such as a cursor control device, a keyboard or any other similar facility. A cursor control facility can thus be used in the device to enable the user to position a cursor at a given location on a screen 808. Moreover, the cursor drive device enables the user to select various commands and to generate drive signals. The cursor control device can be a mouse, one of the buttons of said mouse being used to trigger the generation of the input signals.

The invention claimed is:

1. A countermeasure method for an electronic component implementing a public-key cryptography algorithm on an elliptic curve E defined over a field $\mathbb{K}$, the method comprising implementing one or more iterations of a scalar multiplication operation to obtain a point [k]P from a point P of the curve E and from an integer k using at least one critical point, an electrical consumption of the electronic component being dependent on the value taken by said at least one critical point, the method further comprises:
providing at least one power of an element c of $\mathbb{K}$ said element c being constant, non-null and different from one;
initializing the coordinates of said at least one critical point to predefined values;
implementing said scalar multiplication operation, the coordinates associated with said at least one critical point being modified at each iteration of said scalar multiplication operation by multiplying at least one of the coordinates of the critical point by said at least one power of the element c obtained in the providing, wherein the countermeasure method provides protection against an attack.

2. The method as claimed in claim 1, wherein the element c is chosen to be less than or equal to half the cardinality of a base group of the curve.

3. The method as claimed in claim 1, wherein the element c is chosen to be of order δ strictly greater than three times the number of iterations of the scalar multiplication operation.

4. The method as claimed in claim 3, wherein the implementing the scalar multiplication operation uses a sliding window of size w and comprises:
initializing to zero the coordinates of a point Q used as a working variable and corresponding to a partial scalar multiplication;
pre-computing $2^w$ multiples R[j] of P with j=1 ... $2^w$, R representing said critical point;
performing a doubling of Q and an addition of R [v] and Q with a sliding window, the countermeasure being implemented by modifying at each iteration i the coordinates $(X_{R[v]}, Y_{R[v]}, Z_{R[v]})$ of the point R[v] with $v=(k_i, \ldots, k_{i-w+1})_2$ using the following equality: $(X_{R[v]}, Y_{R[v]}, Z_{R[v]})=(c^2 X_{R[v]}, c^3 Y_{R[v]}, c Z_{R[v]})$.

5. The method as claimed in claim 1, wherein the multiplication of at least one of the coordinates of the at least one critical point by one of the powers of the element c among c, $c^2$, $c^3$, $c^4$ and $c^6$ is determined by using addition chains, c being chosen so as to minimize the length of said addition chains.

6. The method as claimed in claim 5, wherein said implementing the scalar multiplication operation uses a sliding window of size w and comprises:
initializing to zero the coordinates of a point Q used as a working variable and corresponding to a partial scalar multiplication;
pre-computing $2^w$ multiples R[v] of P with j=1 ... $2^w$, R representing said critical point;
performing a doubling of Q and adding R[v] to Q with sliding window, the countermeasure being implemented by modifying the coordinates $(X_Q, Y_Q)$ and $(X_{R[j]}, Y_{R[j]})$ of the points R[j] and Q at each iteration such that:
i. $(X_Q, Y_Q)=(c^2 X_Q, c^3 Y_Q)$
ii. for j ranging from 1 to $2^w$, $(X_{R[j]}, Y_{R[j]})=(c^2 X_{R[j]}, c^3 Y_{R[j]})$.

7. The method as claimed in claim 1, wherein the coordinates associated with said at least one critical point are modified by projection equivalence.

8. The method as claimed in claim 1, wherein the coordinates associated with said at least one critical point are modified by the implementation of an isomorphism φ between the curve E and a second elliptic curve E'.

9. The method as claimed in claim 1, wherein the scalar multiplication operation is implemented by a left-to-right window scalar multiplication, the window being of size w.

10. The method as claimed in claim 1, wherein the scalar multiplication operation is implemented by a Montgomery ladder.

11. The method as claimed in claim 1, wherein the scalar multiplication operation is implemented with right-to-left sliding window in a Non Adjacent Form representation of size w (wNAF).

12. An electronic circuit for public-key cryptography on an elliptic curve E defined over a field $\mathbb{K}$, implementing one or more iterations of a scalar multiplication operation to obtain a point [k]P from a point P of the curve E and from an integer [k]using at least one critical point, an electrical consumption of said component being dependent on the value taken by said at least one critical point, the circuit being further configured to:
provide an element c of $\mathbb{K}$, said element c being constant, non-null, and different from one;
initialize coordinates of the at least one critical point to predefined values;

implement the scalar multiplication operation, the coordinates associated with said at least one critical point being modified at each iteration of said scalar multiplication operation by multiplying at least one of the coordinates of said at least one critical point by a power of the element c wherein the configuration of the circuit provides protection against an attack.

13. The electronic circuit as claimed in claim 12, comprising an internal memory in which the element c is stored.

14. The electronic circuit as claimed in claim 13, wherein the circuit is configured to pre-compute computation procedures corresponding to additions required for updating the coordinates of the at least one critical point, said computation procedures being stored in said internal memory.

15. An electronic system for public-key cryptography on an elliptic curve E defined over a field $\mathbb{K}$ comprising an electronic circuit as claimed in claim 12 and a memory external to said circuit, the element c being stored in said external memory.

16. The electronic system as claimed in claim 15, wherein the circuit is configured to pre-compute computation procedures corresponding to additions required for updating the coordinates of the at least one critical point, said computation procedures being stored in the external memory.

17. A computer program product comprising computing instructions stored on a non-transitory computer storage medium and when the computing instructions are executed by one or more processors, configure the one or more processors to implement a countermeasure method for an electronic component implementing a public-key cryptography algorithm on an elliptic curve E defined over a field K, the countermeasure method comprising implementing one or more iterations of a scalar multiplication operation to obtain a point [k]P from a point P of the curve E and from an integer k using at least one critical point, an electrical consumption of the electronic component being dependent on the value taken by said at least one critical point, wherein the countermeasure method further comprises: providing at least one power of an element c of K, said element c being constant, non-null and different from one; initializing the coordinates of said at least one critical point to predefined values; and implementing said scalar multiplication operation, the coordinates associated with said at least one critical point being modified at each iteration of said scalar multiplication operation by multiplying at least one of the coordinates of the critical point by said at least one power of the element c obtained in the providing, wherein the countermeasure method provides protection against an attack.

* * * * *

UNITED STATES PATENT AND TRADEMARK OFFICE
CERTIFICATE OF CORRECTION

PATENT NO. : 10,374,790 B2  
APPLICATION NO. : 15/118500  
DATED : August 6, 2019  
INVENTOR(S) : Cédric Murdica and Sylvain Guilley Page 1 of 1

It is certified that error appears in the above-identified patent and that said Letters Patent is hereby corrected as shown below:

In the Claims

In Claim 4, Column 12, Line 14, the portion of the text reading -- $(X_{R[v]}, Y^{R[v]}, Z_{R[v]})$ -- should read -- $(X_{R[v]}, Y_{R[v]}, Z_{R[v]})$ --.

In Claim 6, Column 12, Line 27, the portion of the text reading -- $R[v]$ -- should read -- $R[j]$ --.

In Claim 6, Column 12, Line 36, the portion of the text reading -- $(c^2 X_{R[j]}, c\,^3 Y_{R[j]})$ -- should read -- $(c^2 X_{R[j]}, c^3 Y_{R[j]})$ --.

Signed and Sealed this  
Twenty-ninth Day of October, 2019

Andrei Iancu  
*Director of the United States Patent and Trademark Office*